United States Patent [19]

Wolf

[11] 4,269,020
[45] May 26, 1981

[54] MEANS FOR IMPELLING GRASS CLIPPINGS IN A ROTARY-SCYTHE GRASS MOWER

[75] Inventor: Elmar Wolf, Wissembourg, France

[73] Assignee: Sarl O. Wolf, Wissembourg, France

[21] Appl. No.: 24,373

[22] Filed: Mar. 27, 1979

[30] Foreign Application Priority Data

Apr. 7, 1978 [FR] France .............................. 78 11630
Sep. 14, 1978 [FR] France .............................. 78 27561

[51] Int. Cl.³ ............................................. A01O 55/18
[52] U.S. Cl. ...................................... 56/295; 56/13.4
[58] Field of Search ......................... 56/134, 503, 295

[56] References Cited

U.S. PATENT DOCUMENTS

| 2,203,198 | 6/1940 | Junge | 56/295 |
|---|---|---|---|
| 2,737,003 | 3/1956 | Beers | 56/13.4 |
| 2,760,327 | 8/1956 | Bovee | 56/13.4 |
| 2,779,146 | 1/1957 | Mitchell | 56/13.4 |
| 2,910,817 | 11/1959 | Smith et al. | 56/13.7 |
| 2,969,634 | 1/1961 | Lannert | 56/13.4 |
| 3,049,854 | 8/1962 | Denney | 56/295 |
| 3,157,015 | 11/1964 | Russell et al. | 56/12.7 |
| 3,162,990 | 12/1964 | Cook | 56/295 |
| 3,184,903 | 5/1965 | Fjelstad | 56/295 |
| 3,220,170 | 11/1965 | Smith et al. | 56/295 |
| 3,538,692 | 11/1970 | Cope et al. | 56/295 |
| 3,688,479 | 9/1972 | Martinson | 56/502 |
| 3,703,071 | 11/1972 | Anderson | 56/295 |
| 3,905,181 | 9/1975 | Messnier | 56/13.4 |
| 3,963,184 | 6/1976 | Grimm | 241/101.1 |
| 4,015,408 | 4/1977 | Cornellier | 56/295 |
| 4,057,952 | 11/1977 | Brokaw | 56/503 |

Primary Examiner—Paul J. Hirsch
Attorney, Agent, or Firm—Young & Thompson

[57] ABSTRACT

In a rotary-scythe grass mower a device is provided for impelling the grass clippings towards a porous bag or other collecting device, the device being within the mower hood and rotating with the cutter blade or blades. The device may conveniently comprise upwardly and outwardly curving tines in a rake-like or comb-like arrangement on the cutter blade or blades, and/or horizontal rods extending radially from the cutter shaft above the cutter blade or blades.

1 Claim, 4 Drawing Figures

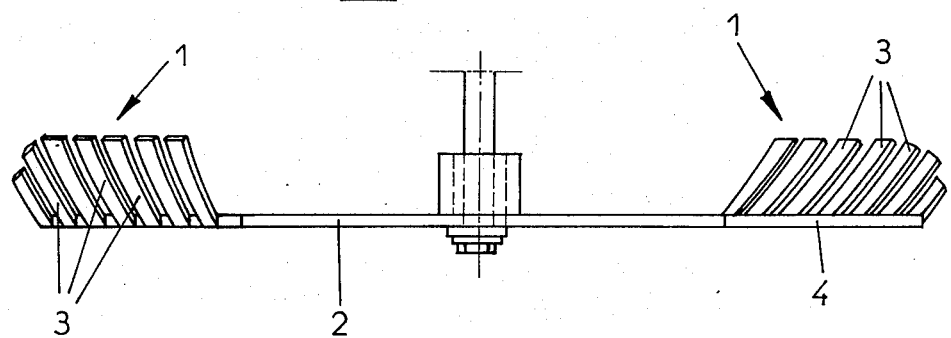
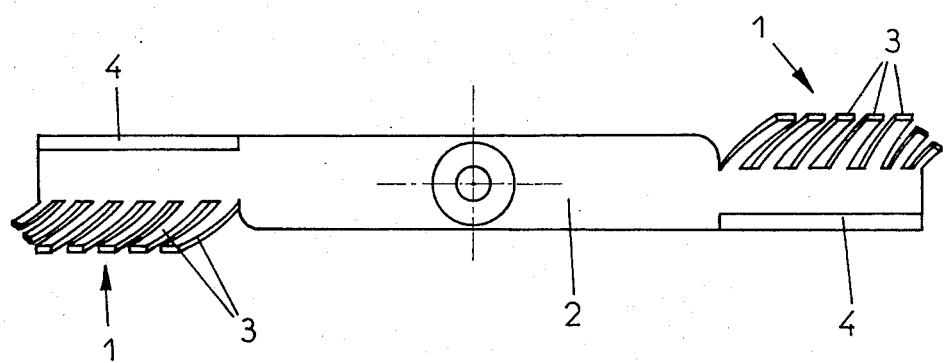

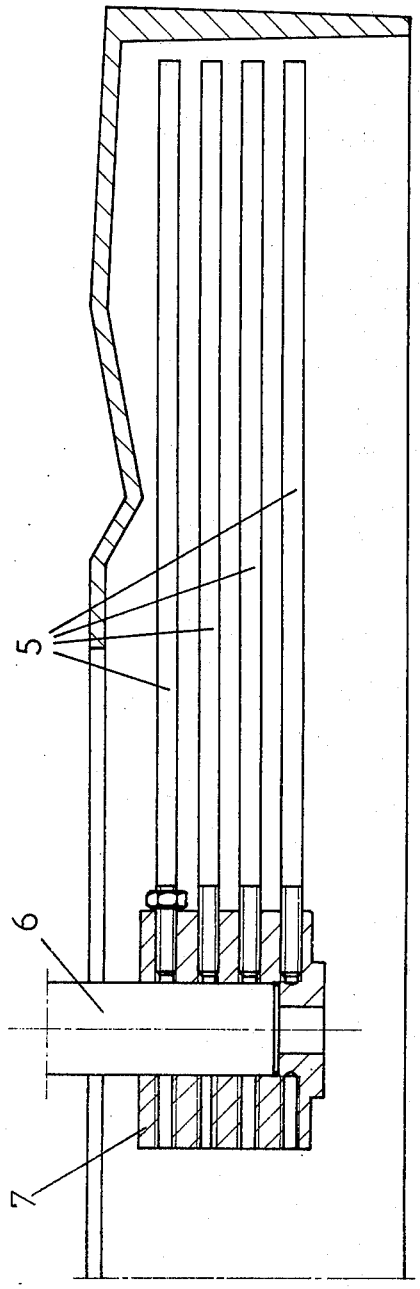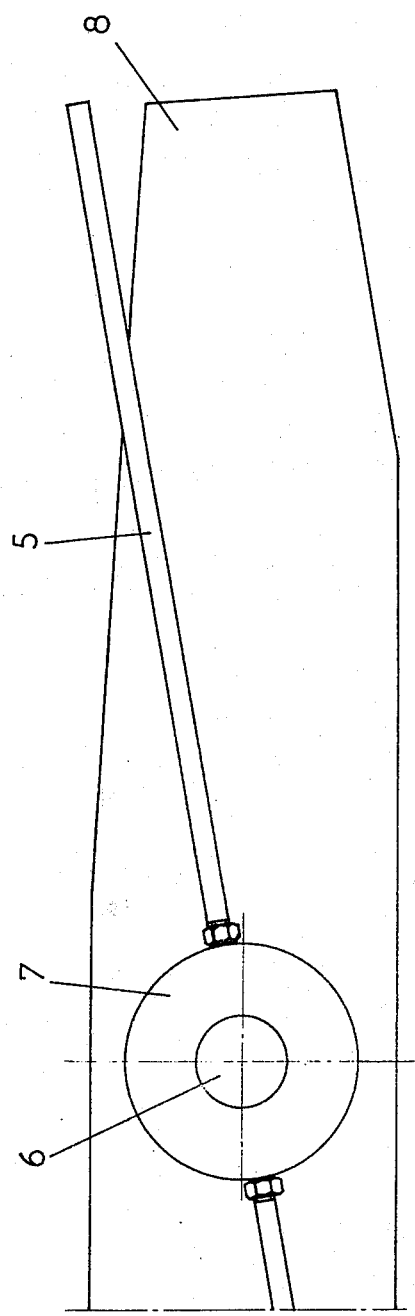

MEANS FOR IMPELLING GRASS CLIPPINGS IN A ROTARY-SCYTHE GRASS MOWER

INTRODUCTION AND BACKGROUND OF THE INVENTION

The present invention relates to a means for impelling grass clippings in a rotary-scythe grass mower.

In known mowers of this type, the conveying of the grass clippings towards the grass-collecting device, such as a grass box, is effected by an air current. The latter is generally obtained by means of blower vanes attached to the blades, or machined thereon, for example by die-pressing. There also exist either fans independent of the cutter bars, set in rotation on the shafts of these bars, or again fan discs fast with the drive shaft of the cutter bars and mounted above the latter, these blower devices being intended to ensure a good current of air for conveying the cut grass.

However the current of air thus produced has high turbulence and causes a high noise level.

The present invention has the purpose of remedying this drawback.

BRIEF SUMMARY OF THE INVENTION

In a preferred embodiment the invention provides, in connection with a cutter device for a rotary-scythe grass mower, a means consisting essentially of a device for impelling grass clippings, having the form of a rake provided in the casing of the mower and rotating with the blades.

FURTHER DESCRIPTION AND ADVANTAGES OF THE INVENTION

In accordance with one characteristic of the invention the impelling device is constituted by impelling elements curved back in such manner that they form an angle with the plane of rotation. By way of example this angle could have a value of 35°.

According to a further characteristic of the invention each blade is provided with a device for impelling grass clippings, in the form of a succession of tines which are turned outwards and inclined upwards.

According to one variant of embodiment of the invention the device for impelling the grass clippings is constituted by small rakes fixed to the cutter bar, behind the blades.

In accordance with a further variant of embodiment of the invention the device for impelling the grass is constituted by one or more impeller bars equipped at their ends with rakes and mounted above the cutter bar or bars.

According to a third variant of embodiment of the invention the device for impelling the grass clippings is constituted by a plurality of rotating bars disposed above the cutter bar, the function of which bars, during the rotation of the said cutter bar, is similar to that of a rake.

Finally in accordane with a further characteristic of the invention the surfaces constituted by the impelling elements can be equipped with one or more openings of any desired form, and the impelling elements can either be constituted in the form of separate elements driven in rotation at the same speed as the cutter bar, or at a different speed therfrom, or can themselves constitute a part of the said cutter bar.

The invention will be more clearly understood from the following description which relates to preferred forms of embodiment given by way of non-limitative examples and explained with reference to the accompanying diagrammatic drawings.

BRIEF DESCRIPTION OF THE VIEWS IN THE DRAWINGS

FIG. 1 is an elevational view of a cutter device provided with the means in accordance with the invention, FIG. 2 is a plan view of the device according to FIG. 1, FIG. 3 is a partial view, in elevation and section, of a variant of embodiment of the invention, and FIG. 4 is a plan view corresponding to FIG. 3.

DETAILED DESCRIPTION OF THE PREFERRED EMBODIMENTS

In accordance with the invention, and as shown by way of example by FIGS. 1 and 2 of the accompanying drawings, the means for impelling grass clippings in a rotary-scythe grass mower consists of a device 1 for impelling the grass clippings, which advantageously is in the form of a rake and is mounted in the casing of the mower.

This device 1 is fast in rotation with the cutter bar 2 and in the example as represented in FIGS. 1 and 2 comprises a succession of tines 3 which are turned outwards, inclined upwards and disposed behind the blades 4. In this example the tines 3 form a direct prolongation of the blades 4 and are obtained in the machining of the cutter bar 2, for example by stamping.

The tines 3 are profiled in such manner that they impel the grass clippings while avoiding the formation of a noise-generating air current.

According to a variant of embodiment of the invention which is not represented in the drawings, it is likewise possible to equip an existing cutter bar with a rake attached behind each blade, in which case this rake can be made of a material different from that constituting the cutter bar, as for example of rigid synthetic material of low cost.

Another variant of embodiment of the invention which is not represented consists in forming the device for impelling grass clippings in the form of one or more impelling bars disposed in the casing above the cutter bar or bars, these impelling bars being equipped at their extremities with rake tines formed on them or with small rakes attached to the extremities of the said impelling bars.

FIGS. 3 and 4 represent another variant of embodiment of the device for impelling grass clippings, in which the device is constituted by a plurality of rotating bars 5 fast with the drive shaft 6 of the cutter bar through the intermediary of a sleeve 7. When the cutter bar 8 is rotating these bars 5 effect an action analogous with that of a rake, without creating harmful turbulence.

By virtue of the invention it is possible to realise a cutter device for a rotary-scythe grass mower which permits good of the grass clippings towards the grass box or the like, without creating a carrier air current which causes a high noise level.

The invention is not of course limited to the forms of embodiment as described and represented in the accompanying drawings. Modifications remain possible, especially from the point of view of the form and constitution of the device for impelling the grass clippings, the number and dimensions of the impelling elements and the number of their openings and the value of their angle with the plane of rotation, without thereby departing from the scope of protection of the invention.

What is claimed is:

1. In a rotary-scythe grass mower, a cutter blade which is an elongated horizontal metal plate having spaced tines stamped from the metal thereof, the tines being spaced apart from each other and extending in a curved configuration from the horizontal part of the blade upwardly and endwise outwardly of the blade, said tines being disposed on trailing edges of said blade, there being cutting edges on the leading edges of the blade.

* * * * *